United States Patent
Bajpai

(10) Patent No.: US 10,868,851 B2
(45) Date of Patent: Dec. 15, 2020

(54) FRAMEWORK TO TEST MEDIA IN MEDIA ENABLED WEB APPLICATION

(71) Applicant: T-Mobile USA, Inc., Bellevue, WA (US)

(72) Inventor: Pradumn Bajpai, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 38 days.

(21) Appl. No.: 16/216,328

(22) Filed: Dec. 11, 2018

(65) Prior Publication Data

US 2020/0186585 A1    Jun. 11, 2020

(51) Int. Cl.
*G06F 15/16* (2006.01)
*H04L 29/06* (2006.01)
*H04L 29/08* (2006.01)
*H04M 7/00* (2006.01)

(52) U.S. Cl.
CPC .......... *H04L 65/80* (2013.01); *H04L 65/1003* (2013.01); *H04L 67/143* (2013.01); *H04M 7/006* (2013.01)

(58) Field of Classification Search
USPC .......................... 709/227, 228, 220, 221, 222
See application file for complete search history.

(56) References Cited

U.S. PATENT DOCUMENTS

| | | | |
|---|---|---|---|
| 2016/0050317 A1* | 2/2016 | Natesan | H04M 3/4936 379/88.01 |
| 2016/0112473 A1* | 4/2016 | Labranche | H04M 3/42374 709/204 |

\* cited by examiner

*Primary Examiner* — Lan Dai T Truong
(74) *Attorney, Agent, or Firm* — Lee & Hayes, P.C.

(57) ABSTRACT

A framework for testing media in a media enabled web application is described. A media enabled web application such as a voice over Internet protocol ("VOIP") is initiated between an originating web browser window and terminating or receiving web browser window. A WebRTC module is initiated on the terminating or receiving web browser window to record testing media transferred from the originating web browser window. The captured media is compared to the testing media to determine the quality of service of the media enabled web application.

19 Claims, 4 Drawing Sheets

FRAMEWORK TO TEST MEDIA IN MEDIA ENABLED WEB APPLICATION

BACKGROUND

Various telecommunications technologies allow for the use of multiple cellular numbers on a single device. Like many technical features, testing these technologies to ensure they are operational can be important when offering the technical features to customers.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
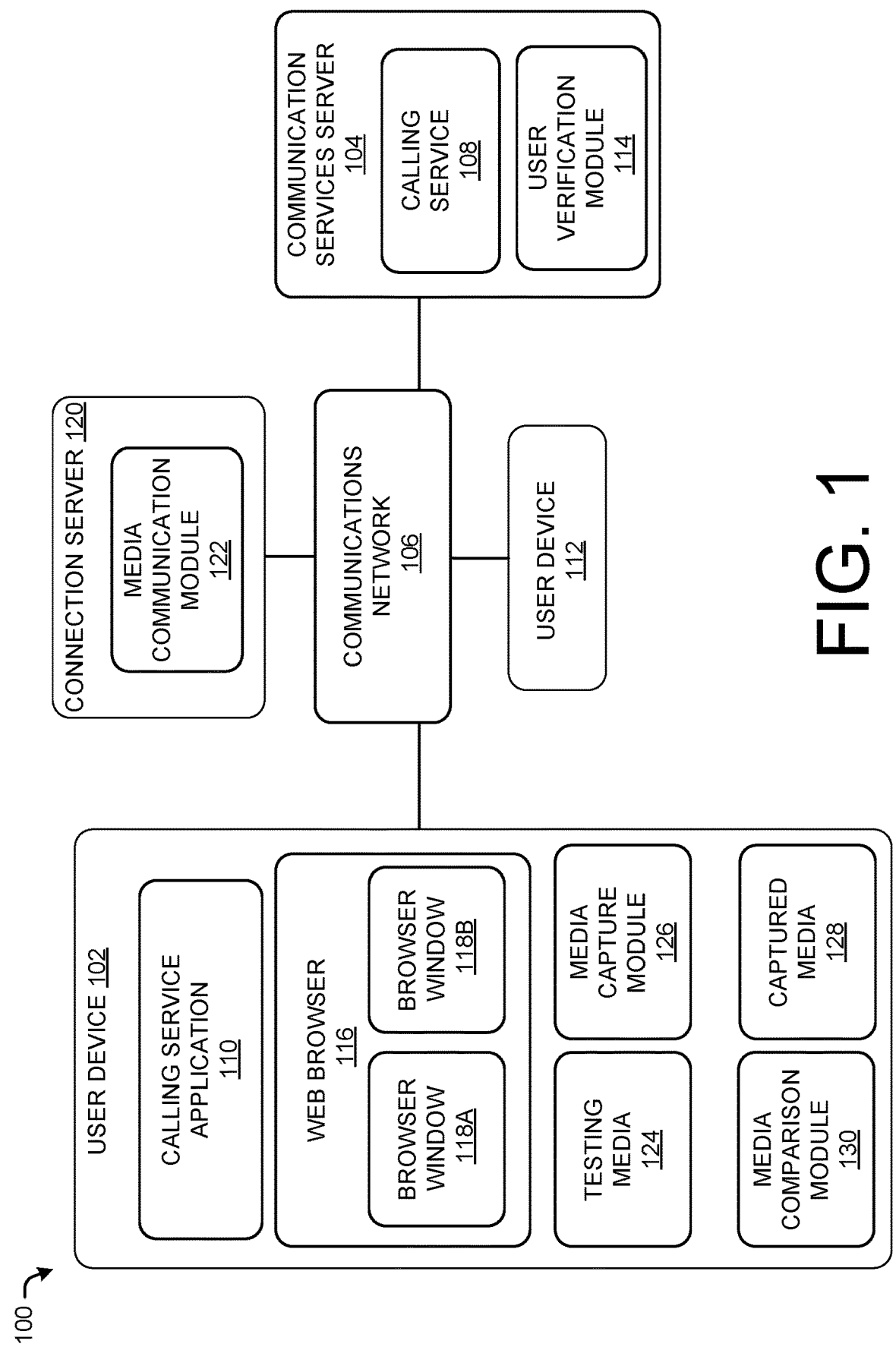
FIG. 1 illustrates an example operation environment to provide a framework for testing media in a web application.

Described herein are technologies to provide a framework for testing media in a media enabled web application. In conventional technologies, when testing Internet protocol (IP)-based programs that associate multiple cellular numbers with a single device, a call from an originating device is made and a determination is made as to whether or not the call was connected between the originating device and the terminating device by observing the terminating device. In some technologies, one or more web browsers can be used to initiate and/or receive a call. For example, a call may be initiated on one browser, whereby another receiving web browser receives the call. To test whether or not the call was successfully connected, the status of the receiving web browser is observed.

However, using this process requires additional human and computing resources. For example, a human is often required to observe a status change in the receiving web browser. In another example, testing frameworks may not indicate whether media such as voice or video is being transmitted from the originating web browser to the receiving web browser. While the testers may observe a successful connection by observing a status change in the receiving browser, the connection may, in fact, not be successful, hiding potential problems with the backend systems (such as the Internet Protocol Multimedia Subsystem ("IP IMS") service management layer). As a means of attempting to alleviate the issue, conventional methods often use a human to talk into a microphone associated with the originating web browser, requiring even further human resources.

To alleviate some of the technical issues present in the conventional art, various implementations of the present disclosure for testing calls institute a media argument application using an Internet browser on an initiating end of the call and a media capture application on the terminating end of the call. In some examples, a first Internet browser window is initiated. A first instance of a calling web application is initiated within the first browser window. A second instance of the calling web application is initiated in a second web browser window. A call is initiated using the first instance of the calling web application to the second instance of the calling web application. Upon an indication or notice that a call is setup between the first instance of the calling web application and the second instance of the calling web application, a predetermined media is selected and initiated within the first instance of the calling web application. A collector application is initiated in the second instance of the calling web application to receive the media. The media that is received is saved and analyzed.

In some examples, the technical and resource issues present in conventional technologies can be at least partially alleviated using various examples of the presently disclosed subject matter. For example, as noted above with respect to the use of human resources needed to test audio connections, using media selection and capture technologies can provide the same or similar functionality without the need of human resources. Further, instead of relying on visual changes to an interface to determine a connection, media captured or received by the receiving web application can be analyzed. Thus, the instances of the present disclosure provide improvements to the functioning of a computer by testing one or more connections, transferring media from a source to a destination, and verifying (e.g., on a bit level) an authenticity of the received media relative to the transmitted media. These and other improvements to the functioning of the computer are discussed herein.

FIG. 1 illustrates an example operation environment 100 to provide a framework for testing media in a media enabled web application. User device 102 may be a mobile device used by a user (not pictured), a computer, laptop, or the like. The user device 102 can communicate with a communication services server 104 through communications network 106. The communications network 106 may vary depending on the communication connection initiated by the user device 102. For example, in some examples, the communications network 106 may be a cellular network including, but not limited to, Global System for Mobile Communications (GSM), General Packet Radio Service (GPRS), cdma-One, CDMA2000, Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/TDMA), and Integrated Digital Enhanced Network (iDEN). In some examples, the communications network 106 can include any network topologies including, but not limited to, 2G, 3G, 4G, 4G LTE, 5G, Wi-Fi, Bluetooth, Bluetooth Low Energy, and the like. In other examples, the communication network can be wired or wireless Internet Protocol-based networks capable of establishing communication with the communication services server 104.

The communication services server 104 has a calling service 108. In some examples, the calling service 108 is similar to a voice over Internet protocol ("VoIP") service. In some examples, VoIP is a technology that allows a user to make voice calls using a broadband Internet connection instead of a regular (or analog) phone line.

In normal use, a calling service application 110 can be installed on the user device. The calling service application 110 can receive various inputs from a user to initiate a call using the calling service application 110. After initialization on the user device 102, the calling service application 110 receives a telephone number to place a call with. The user device 102, being the call originating device, transmits the information through the communications network 106 to the communication services server 104.

The communication services server 104 receives information from the user device 102 and initiates the calling service 108. The calling service 108 sends a signal to a telephone adapter (not illustrated) associated with a user device 112, instructing the user device 112 to ring. Once the user device 112 receives an input to connect with the user device 102, the calling service 108 establishes a session between the user device 102 and the user device 112, sending packets of data between the user device 102 and the user device 112 as a telephone call (also referred to generally as a communication session). As noted above, the user device 102 and/or the user device 112 can be a cellular phone, a computer, a laptop, or the like.

In some examples, the calling service application 110 is limited to a particular set of users, such as users that subscribe to the use of a particular provider of the communications network 106 and/or the calling service 108. In these examples, when a notice is received from the user device 102 to use the calling service 108, the calling service 108 can access a user verification module 114. The user verification module 114 can determine if the user or the user device 102 is approved to use the calling service 108. Various technologies can be used to verify whether the user is approved to use the calling service 108 (e.g., password, look up table storing approved user information, at the like), and all are considered to be within the scope of the presently disclosed subject matter.

To test the operation of the calling service 108, a web browser 116 may be initiated on the user device 102. Two browser windows, browser window 118A and browser window 118B, may be initiated. The browser window 118A can be used as the originating caller browser window and the browser window 118B can be used as the terminating or receiving browser window. The calling service application 110 can be installed and initiated as an operable component or module of the web browser 116. It should be noted that in FIG. 1, the browser window 118A and the browser window 118B are shown as being initiated on the same device, i.e. the user device 102. However, the presently disclosed subject matter is not limited to having the browser window 118A and the browser window 118B as being initiated on the same device, as the browser window 118A and the browser window 118B can be initiated on different devices.

During testing, the calling service application 110 can be initiated in the browser window 118A. The number to a similarly configured calling service application 110 installed in the browser window 118B can be called from the browser window 118A. The communications network 106 receives the call setup notice, transfers the call setup notice to the calling service 108, and after verifying the calling service application 110, if so configured, a call is set up between the browser window 118A and the browser window 118B.

To test the connection, the web browser 116 communicates with a connection server 120. The connection server 120 helps to establish communications between two communication platforms, such as the browser window 118A and the browser window 118B as a peer-to-peer network. It should be noted that although the connection server 120 is illustrated as a separate server than the communications server 104 (or another server not shown), it should be understood that the connection server 120 and the functionality associated with the connection server 120 can be provided in various ways. For example, the functionality of the connection server 120 can be provided by the communication services server 104.

The connection server 120 receives a connection request from the browser window to connect to the browser window 118B using the calling service application 110. The connection server 120 invokes a media communication module 122. In some examples, the media communication module 122 can be a service such as Web Real Time Communication ("WebRTC"). In this example using WebRTC, the connection server 120 can be a Session Traversal Utilities for NAT ("STUN") server, where NAT is "Network Address Translation."

In the context of WebRTC, STUN servers operate on the Internet and check the IP:port address of an incoming request, such as from the browser window 118A and send that address back as a response. In other words, the application uses a STUN server to discover its IP:port from a public perspective. This process enables a WebRTC peer, such as the browser window 118A, to obtain a publicly accessible address for itself, and then pass that on to another peer, such as the browser window 118B, via a signaling mechanism, in order to set up a direct link. It should be understood that other peer-to-peer technologies similar to WebRTC may be used.

To test the calling service application 110, once the browser window 118A and the browser window 118B are connected using the media communication module 122, such as WebRTC, testing media 124 can be transferred through the connection, i.e. placed as an argument, from the browser window 118A to the browser window 118B. A media capture module 126 in the web browser 118B can be used to capture the testing media 124. In some examples, the media communication module 122 can be used to capture and store the testing media 124.

The testing media 124 that is captured, illustrated as captured media 128, can be compared against the testing media 124 using the media comparison module 130. For example, the comparison can be performed using libraries such as python libraries or various voice comparison tools. In some examples, the media comparison module 130 can compare a hash or checksum associated with the testing media 124 with a hash or checksum associated with the captured media 128. In some examples, the testing media 124 can be an audio file, video file, or audio/video file. In other examples, the testing media 124 can be audio captured from a microphone or video captured from a web camera.

In some examples, the example operation environment 100 can provide various advantages over conventional technologies for testing. For example, when testing the calling service application 110, using the media communication module 122 provides the ability to perform real-time testing of the testing media 124. Further, using the media communication module 122 provides the ability to capture the testing media 124 as the captured media 128, allowing a user to determine if the calling service application 110 is operating. In some examples, the use of the testing media 124 and the captured media 128 can reduce human resources, as well as reduce the use of communication resources as the captured media 128 can be used to verify that the calling service application 110 is operating.

In some examples, the example operation environment 100 can provide for multiple phases of testing. In some examples, it may be desirable to have an indication prior to testing the captured media 128 that the calling service application 110 is operating. For example, the testing media 124 can include connect information 132 and transmission data 134. In some examples, the media comparison module 130 can be initiated when the calling service application 110, the media communication module 122, or another suitable application is initiated.

When a call is setup between the browser window 118A and the browser window 118B, the testing media 124 is transferred and captured as captured media 128, as provided in various examples as illustrated above. However, in the current example, the testing media includes the connect data 132 and the transmission data 134. Rather than waiting until the entire testing media 124 is received and captured as the captured media 128, the media comparison module 130 commences analyzing the captured media 128 as it is received during a call. The media comparison module 130 analyzes the captured media 128 to determine if connect data 132 is received. The connect data 132 can be various forms of data that, when analyzed by the media comparison module 130, indicate a successful connection. For example, the connect data 132 can include a timestamp, unique data specific to a testing session, or other data that indicates that a particular testing session call has been completed successfully. This may be beneficial in various circumstances. For example, various calling service applications 110 may not have functionality that indicates a successful connection. If a data transfer of the testing media 124 to be captured media 128 is not successful because of a failure to connect a call, the tester and/or the media comparison module 130 may not realize this failure until the entire testing media 124 is captured as the captured media 128, thereby wasting time. Having unique data as the connect data 132 that the media comparison module 130 can use while the captured media 128 is being captured can reduce time and costs.

The captured media 128 may be tested, or validated, using various operations. For example, the captured media 128 may be validated at a network level by capturing the captured media 128 on the network. However, during use, there may be a significant number of streams of audio and/or video data, including the testing media 124, that may be received over the network. This type of testing, whereby the testing media 124 is transmitted in-line with other testing or in-use (e.g. data from users or customers of a network using the network) data, may be beneficial because it may more closely simulate the actual conditions that may be experienced when the testing media 124 is transferred over the network. To capture the captured media 128 from the other data concurrently being received, one or more filters may be used. For example, the testing media 124 may have a specific Real-time Transport Protocol payload type assigned to the stream. Other methods of filtering the captured media 128 from other media being concurrently received can include filtering according to a number of packets as well as other filtering technologies. The use of filtering may allow testing conditions to be established that are close to operational conditions while providing for the ability to separate out testing data.

The testing media 124 can also include the transmission data 134. The transmission data 134 can be the various forms of media (voice, video, text, and the like) that is transmitted and compared by the media comparison module 130. The transmission data 134 can also include other forms of data. For example, the transmission data 134 can include timestamps that can be used by the media comparison module 130 to test latency. For example, the captured media 128 can be timestamped as the captured media 128 is received. The media comparison module 130 can compare the transmitted timestamp in the transmission data 134 to the captured timestamp in the captured media 128, with the difference an indicator of latency. In some examples, the media comparison module 130 can provide the determined latency to the connection server 120 to be used by the connection server 120 for identifying and troubleshooting potential issues. The media comparison module 130 can also provide the results of the comparison of the testing media 124 and the captured media 128 to the connection server 120 to provide the connection server 120 with an indication of quality of data transfer. For example, if the comparison of the testing media 124 and the captured media 128 indicates that there are a significant number of dropped or missing packets of data, the connection server 120 can use that information to identify and troubleshoot potential connection issues.

Figure 2:
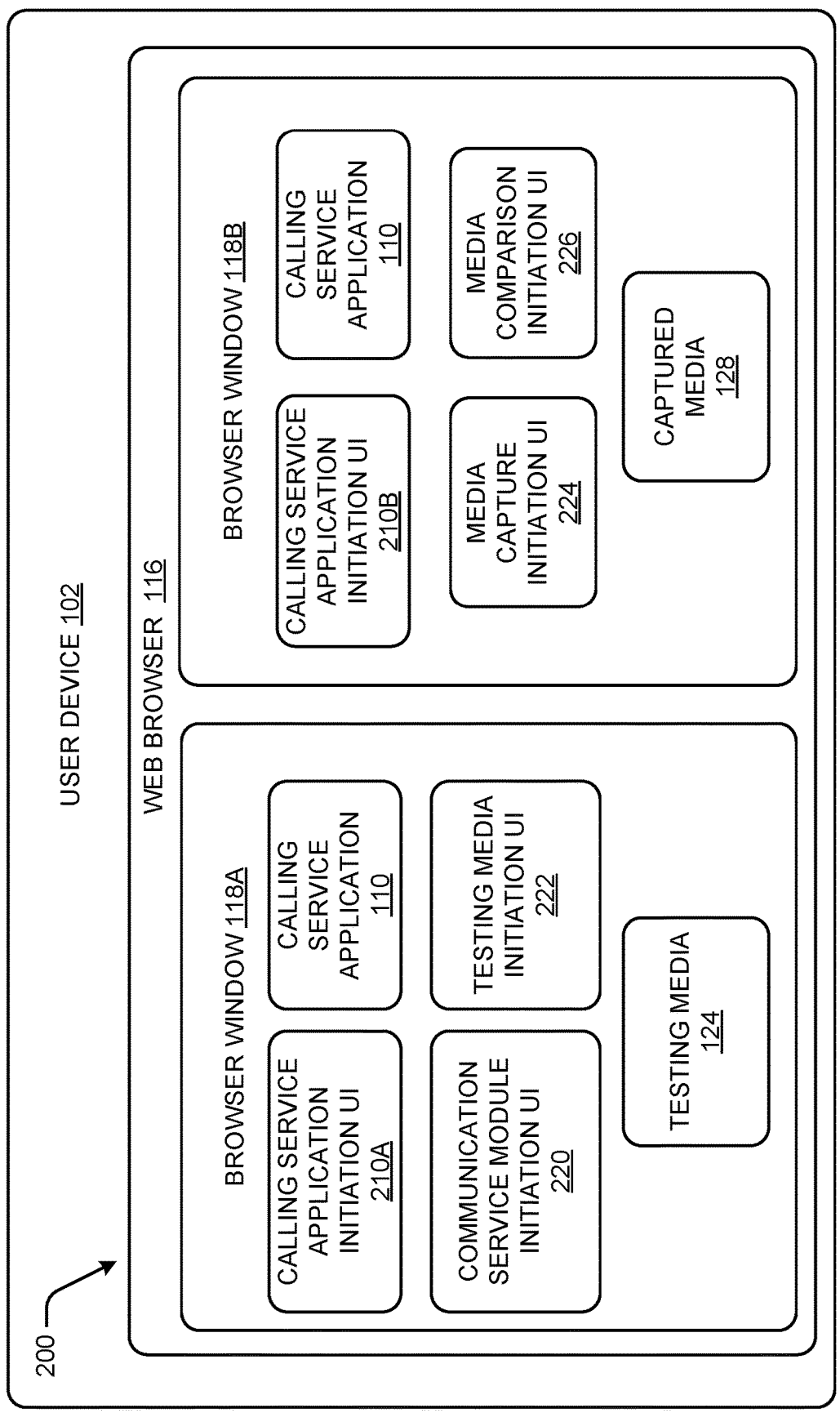
FIG. 2 is a diagram showing a web browser rendered in a display of a user device used to test a calling service application.

FIG. 2 is a diagram showing the web browser 116 rendered in display 200 of the user device 102 used to test the calling service application 110. In FIG. 2, the web browser 116 is shown as having two browser windows, browser window 118A and browser window 118B. To test the calling service application 110, a calling service application initiation user interface ("UI") 210A is rendered. Although it is shown that a calling service application initiation UI 210B is also rendered in the browser window 118B, in some examples, the calling service application initiation UI 210B does not need to be initiated or used. The calling service application initiation UI 210A receives an input to initiate a session (or call) between the browser window 118A and the browser window 118B. The calling service application 110 in browser window 118A is initiated. The calling service 108 initiates a session between the calling service application 110 in browser window 118A and the calling service application 110 in browser window 118B.

To test if the session is connected in a manner that facilitates the transfer of media, as well as testing the quality of the connection, a communication service module initiation UI 220 is provided. The communication service module initiation UI 220 initiates the media communication module 122. Once initiated, a testing media initiation UI 222 is provided. The testing media initiation UI 222 is configured to receive an input to cause the transfer of the testing media 124 to the browser window 118B. In browser window 118B, a media capture initiation UI 224 is provided. Upon receipt of an input, the media capture initiation UI 224 configures the browser window 118B to capture the testing media 124 and store as the captured media 128. The media may thereafter be compared by selecting a media comparison initiation UI 226.

It should be noted that various modules or functionality is illustrated as an example configuration in FIG. 2. Other configurations may be used and are considered to be within the scope of the presently disclosed subject matter. For example, some functionality may be combined. In one example, a selection of the testing media initiation UI may thereafter initiate the media capture functionality of the web browser window 118B. In another example, once a session is initiated by the calling service 108, the functionality of initiating the media capture module, transfer of testing media, and capturing of the testing media may be initiated without user input. These and other variations are considered to be within the scope of the present disclosure.

Figure 3:
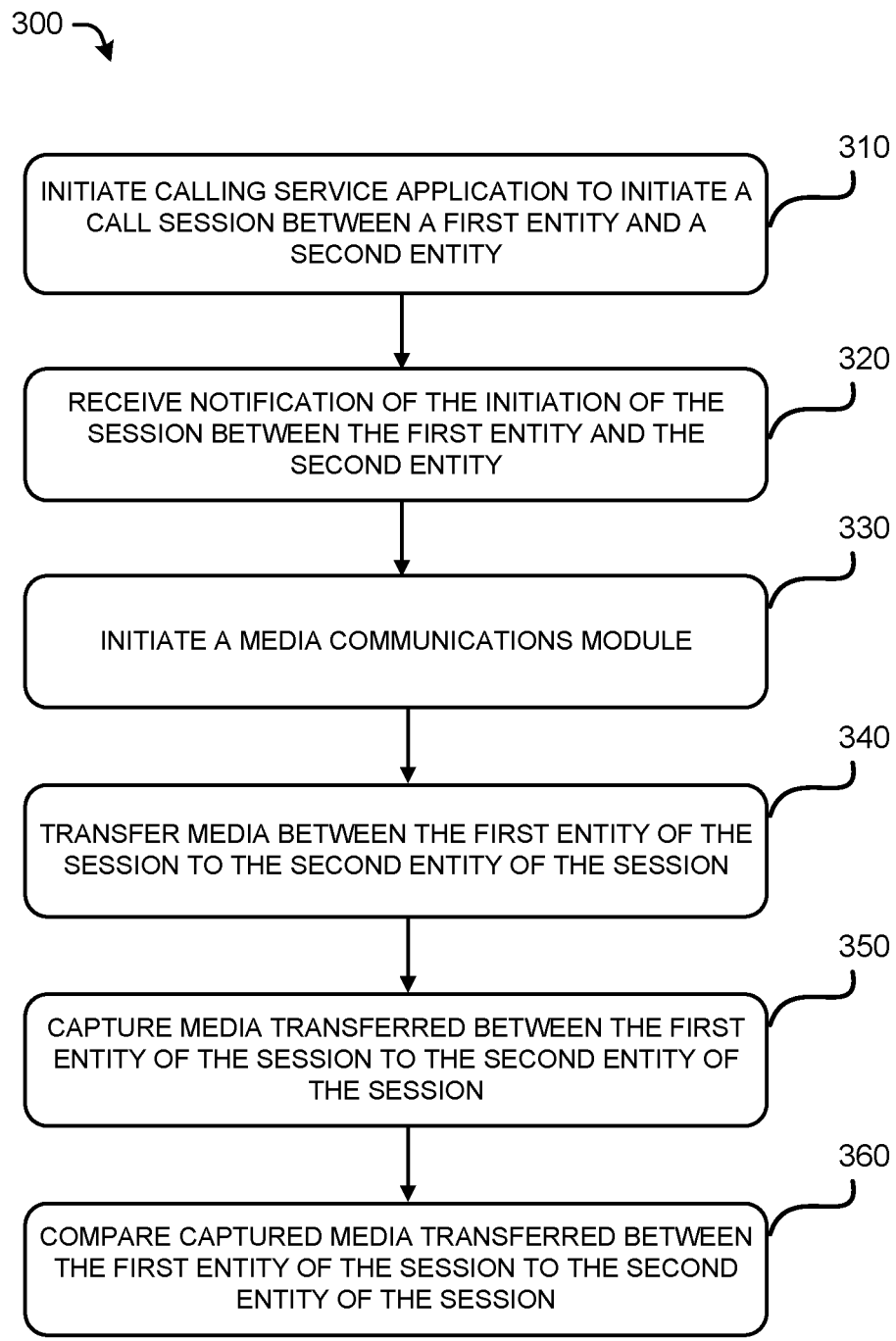
FIG. 3 is an illustrative process for providing a framework for testing media in a media enabled web application.

FIG. 3 is an illustrative process 300 for providing a framework for testing media in a media-enabled web application. The process is illustrated as example flow graphs, each operation of which may represent a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Referring to FIG. 3, the process of providing a framework for testing media in a media-enabled web application process 300 commences at operation 310, where a calling service to initiate a call session between a first entity and a second entity is initiated. In some examples, the first entity is the web browser window 118A and the second entity is the web browser window 118B, though other entities may be used and are considered to be within the scope of the presently disclosed subject matter. In some examples, the calling service application 110 is a service such as the T-MOBILE DIGITS service. In some examples, the calling service 108 is similar to a VoIP service.

The process 300 continues to operation 320, where a notification is received that the call session between the first entity and the second entity has been initiated. In some examples, this notification can be indicated by a change of appearance of the calling service application 110 on the second entity.

The process 300 continues to operation 330, where the media communications module 122 is initiated. In some examples, the media communications module 122 is a component of the WebRTC service. A WebRTC peer, such as the browser window 118A, can obtain a publicly accessible address for itself, and then pass that on to another peer, such as the browser window 118B, via a signaling mechanism, in order to set up a direct link that allows for the capture of media to test the call session. It should be understood that other peer-to-peer technologies similar to WebRTC may be used.

The process 300 continues to operation 340, where media is transferred between the first entity and the second entity. The media, such as the testing media 124, can be various forms of media such as video, audio, audio/video and the like. The presently disclosed subject matter is not limited to any particular type of media.

The process 300 continues to operation 350, where the testing media 124 is captured at the second entity using the media communication module 122 as the captured media 128.

The process 300 continues to operation 360, where the captured media 128 is compared to the testing media 124 to test the call session. In some examples, if the comparison indicates an unsuccessful test, the process 300 can be performed again. In further examples, if the comparison indicates an unsuccessful test, other operations may be performed and are considered to be within the scope of the presently disclosed subject matter.

Figure 4:
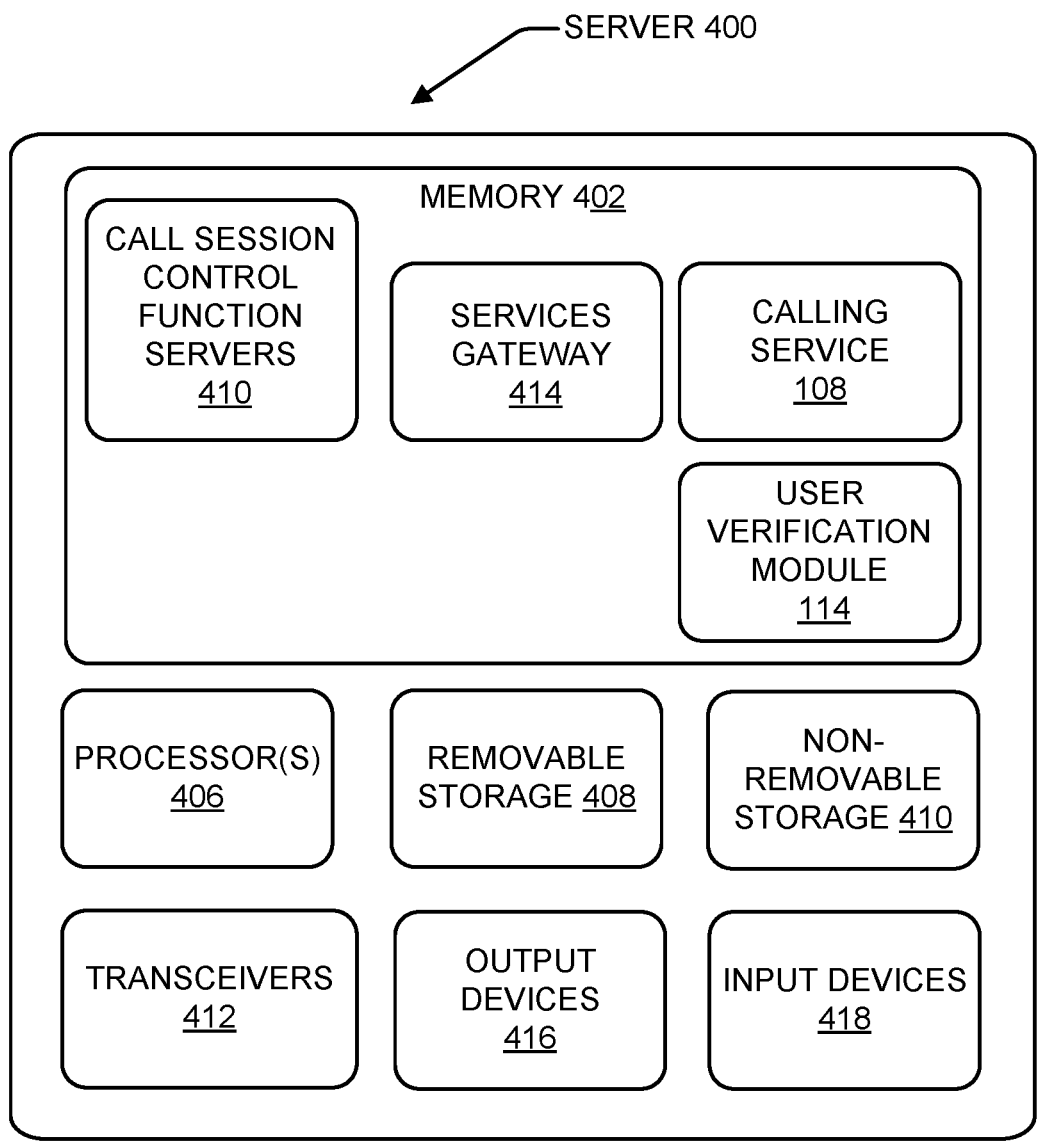
FIG. 4 illustrates a component level view of a server configured for use within a wireless communication network in order to provide various services within a wireless communication network.

FIG. 4 illustrates a component level view of a server 400 configured for use within a wireless communication network in order to provide various services within the wireless communication network, such as the calling service 108, the user verification module 114, call session control function servers 410, and a services gateway 414. The services gateway 414 can interface with the user verification module 114 to verify a user's registration with the calling service 108 and generates an authorization token for the user. The token is sent to the user device 102 using an encrypted Session Initiation Protocol (SIP). When the user wants to access an online application program, a program or browser running on the communication device generates an HTTP or HTTPS request to a services gateway (SG). Note that where "HTTP" is used herein, the system may also represent secure HTTP communications using encryption or HTTPS. Additional details of the Call Session Control Function servers 410 may be found in the U.S. Pat. No. 8,762,559, entitled "System and Method for Non-IMS Application Service Access Over IP Multimedia Subsystem," filed on Dec. 16, 2011, which is herein incorporated by reference in its entirety.

In some examples, the server 400 can comprise or perform functionality similar to the communication services server 104. The server 400 may be located in a radio network controller ("RNC") or gateway. Additionally, the server 400 may be a separate entity located separately from the RNC or gateway. As illustrated, the server 400 comprises a system memory 402 storing computer-executable instructions to implement the calling service 108, the user verification module 114, the call session control function servers 410, or the services gateway 414. The system memory 402 may also store additional applications, data, or programs. Also, the server 400 includes processor(s) 406, a removable storage 408, a non-removable storage 410, transceivers 412, output device(s) 416, and input device(s) 418.

In various implementations, system memory 402 is volatile (such as RAM), non-volatile (such as ROM, flash memory, etc.) or some combination of the two. In some implementations, the processor(s) 406 is a central processing unit (CPU), a graphics processing unit (GPU), or both CPU and GPU, or any other sort of processing unit.

The server 400 may also include additional data storage devices (removable and/or non-removable) such as, for example, magnetic disks, optical disks, or tape. Such additional storage is illustrated in FIG. 4 by removable storage 408 and non-removable storage 410.

Non-transitory computer-readable media may include volatile and nonvolatile, removable and non-removable tangible, physical media implemented in technology for storage of information, such as computer readable instructions, data structures, program modules, or other data. System memory 402, removable storage 408 and non-removable storage 410 are all examples of non-transitory computer-readable media. Non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information and which can be accessed by the server 400. Any such non-transitory computer-readable media may be part of the server 400.

In some implementations, the transceivers 412 include any sort of transceivers known in the art. For example, the transceivers 412 may include wired communication components, such as an Ethernet port, for communicating with other networked devices. Also, or instead, the transceivers 412 may include wireless modem(s) to may facilitate wireless connectivity with other computing devices. Further, the transceivers 412 may include a radio transceiver that performs the function of transmitting and receiving radio frequency communications via an antenna.

In some implementations, the output devices 416 include any sort of output devices known in the art, such as a display (e.g., a liquid crystal display), speakers, a vibrating mechanism, or a tactile feedback mechanism. Output devices 416 also include ports for one or more peripheral devices, such as headphones, peripheral speakers, or a peripheral display.

In various implementations, input devices 418 include any sort of input devices known in the art. For example, input devices 418 may include a camera, a microphone, a keyboard/keypad, or a touch-sensitive display. A keyboard/keypad may be a push button numeric dialing pad (such as on a typical telecommunication device), a multi-key keyboard (such as a conventional QWERTY keyboard), or one or more other types of keys or buttons, and may also include a joystick-like controller and/or designated navigation buttons, or the like.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for testing an Internet-enabled calling service, comprising:
    initiating a call session from a first entity to a second entity using a calling service;
    receiving a notification that the call session is initiated;
    initiating a media communications module at the second entity to enable a capture of testing media transmitted from the first entity during the call session;
    initiating a transfer of the testing media from the first entity to the second entity over a communications network; and
    capturing the testing media as captured media at the second entity using the media communications module, wherein the first entity and the second entity are both located on a same user device.

2. The method of claim 1, wherein the calling service is a voice over Internet Protocol service.

3. The method of claim 1, wherein the first entity is a first web browser window of a web browser and the second entity is a second web browser window of the web browser.

4. The method of claim 1, wherein the first entity is a first web browser window of a first web browser and the second entity is a second web browser window of a second web browser on the user device.

5. The method of claim 1, wherein the media communications module comprises a WebRTC module.

6. The method of claim 1, wherein the testing media comprises an audio file, a video file, or an audio/video file.

7. The method of claim 1, further comprising:
    comparing the captured media to the testing media;
    determining that the difference is above a threshold; and
    providing an output to a user indicating that the difference is above a threshold.

8. A non-transitory computer-readable storage medium having computer-executable instructions stored thereupon that, when executed by a computer, cause the computer to:
    initiate a call session from a first entity to a second entity using a calling service;
    receive a notification that the call session is initiated;
    initiate a media communications module at the second entity to enable a capture of testing media transmitted from the first entity during the call session, the testing media including connect data and transmission data;
    initiate a transfer of the testing media from the first entity to the second entity;
    capture the testing media as captured media at the second entity using the media communications module; and
    while the captured media is being captured, analyze the captured media to determine if the connect data has been received.

9. The non-transitory computer-readable storage medium of claim 8, wherein the calling service is a voice over Internet Protocol service.

10. The non-transitory computer-readable storage medium of claim 8, wherein the first entity is a first web browser window of a web browser and the second entity is a second web browser window of the web browser.

11. The non-transitory computer-readable storage medium of claim 8, wherein the first entity is a first web browser window of a first web browser and the second entity is a second web browser window of a second web browser on a user device.

12. The non-transitory computer-readable storage medium of claim 8, wherein the first entity is a first web browser window of a first web browser on a first user device and the second entity is a second web browser window on a second user device.

13. The non-transitory computer-readable storage medium of claim 8, wherein the media communications module comprises a WebRTC module.

14. The non-transitory computer-readable storage medium of claim 8, wherein the testing media comprises an audio file, a video file, or an audio/video file.

15. The non-transitory computer-readable storage medium of claim 8, further comprising computer-executable instructions that, when executed by the computer, cause the computer to:
    compare the captured media to the testing media;
    determine that the difference is above a threshold; and
    provide an output to a user indicating that the difference is above a threshold.

16. A system comprising:
    a non-transitory storage medium; and
    instructions stored in the non-transitory storage medium, the instructions being executable by the system to:
        initiate a call session from a first entity with a calling service to a second entity;
        receive a notification that the call session is initiated;
        initiate a media communications module at the second entity to enable a capture of testing media transmitted from the first entity during the call session, the testing media including connect data and transmission data;
        initiate a transfer of testing media from the first entity to the second entity;
        capture the testing media as captured media at the second entity using the media communications module; and
        while the captured media is being captured, compare the captured media to the testing media to determine if the connect data has been received.

17. The system of claim 16, wherein the calling service is a voice over Internet Protocol service.

18. The system of claim 16, wherein the first entity is a first web browser window of a web browser and the second entity is a second web browser window of the web browser.

19. The system of claim 16, wherein the media communications module comprises a WebRTC module.

* * * * *